July 1, 1930.  B. R. BENJAMIN  1,769,103
TRACTOR IMPLEMENT
Filed March 8, 1928   2 Sheets-Sheet 1

Inventor
Bert R Benjamin
By N.P. Doolittle
Atty

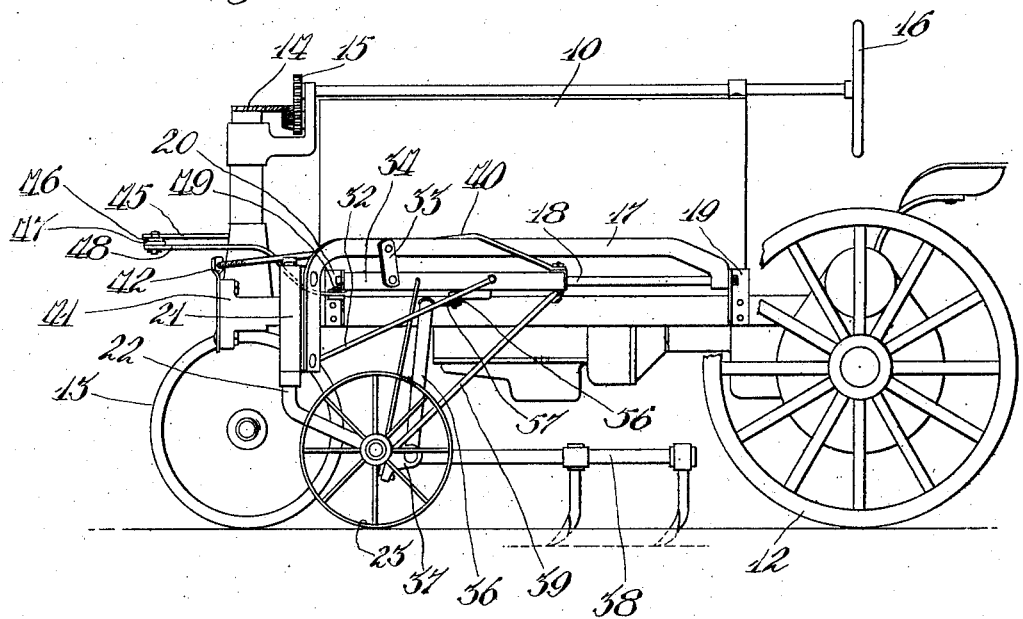

Patented July 1, 1930

1,769,103

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

TRACTOR IMPLEMENT

Application filed March 8, 1928. Serial No. 259,945.

The present invention relates to tractor propelled agricultural implements and to improved means for mounting and propelling an implement at one side of a tractor.

The main object of the invention is to provide a simple and efficient side frame attachment for tractors that will permit implements of various types to be mounted at one or both sides of a tractor ahead of the traction wheels, and support them in a manner to allow free movement vertically between the tractor and attached implement. Further objects are to provide a vertically flexible or floating side frame attachment which will be effectively braced as against fore and aft movement and will at least triple the ground space normally spanned by the tractor wheels and provide ground supports for the attachment which will readily follow the turning movements of the tractor. A more specific object is to provide a side attachment carrying multiple row crop cultivating means, the plant dodging movements of which are controlled through the tractor steering means.

The foregoing and other minor objects and advantages are attained by the organization and details of construction hereinafter more particularly described and claimed, and illustrated in the accompanying drawings, where—

Figure 2 is a side view of the structure shown in Figure 1; and

Figure 3 is an enlarged detail view on the line 3—3 of Figure 1.

Figure 1:
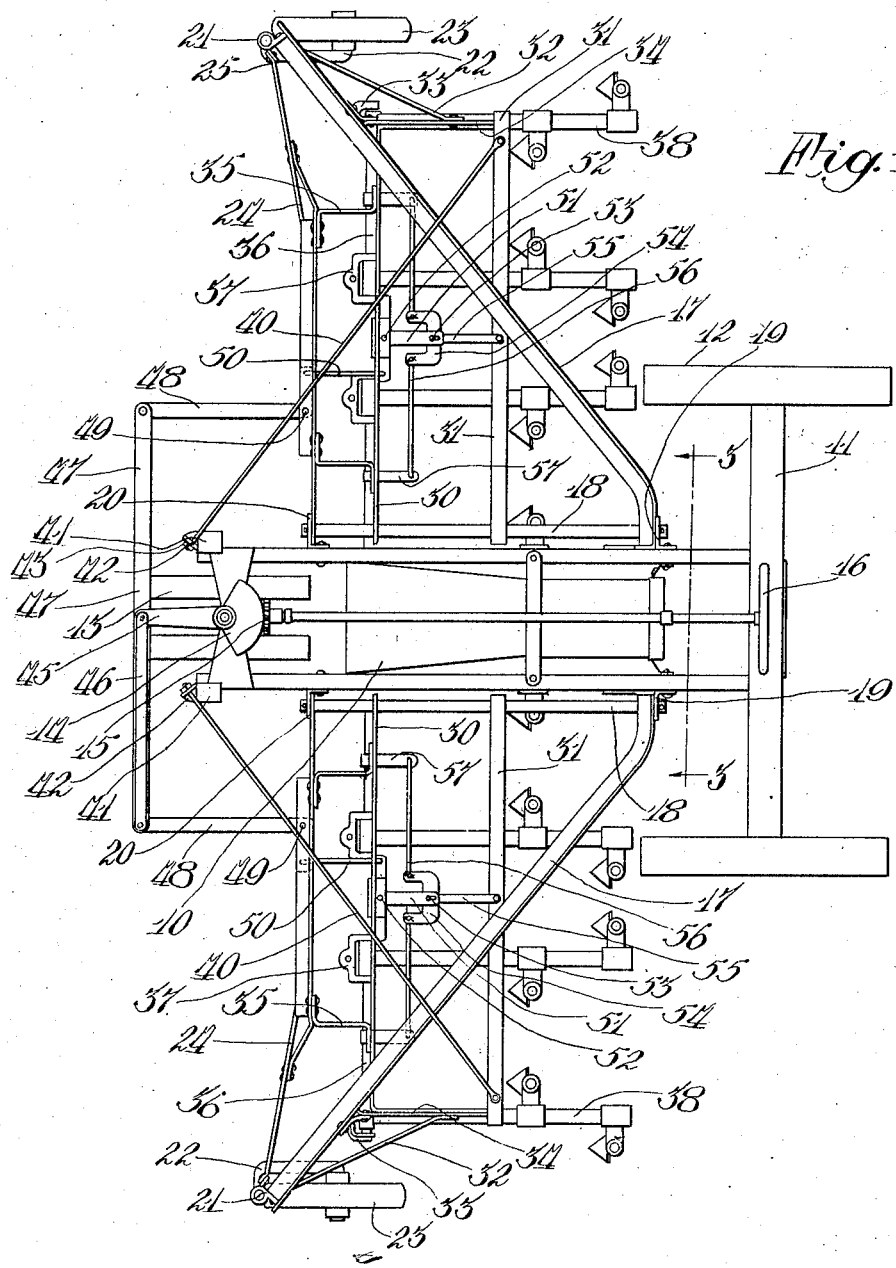
Figure 1 is a plan view of a self-propelled cultivator organization embodying the side frames of the invention.

In the present embodiment of the invention the novel organization is illustrated as comprising a tractor having a narrow longitudinal frame or body 10, the rear end of which is supported on a laterally extended axle 11 and traction wheels 12. At its front end the body 10 is supported on steering wheels 13. The steering wheels 13 are part of a dirigible truck which has a vertical standard swiveled in the frame, the forward end of which is provided with a gear sector 14 cooperating with gearing 15 on a steering rod controlled by a hand wheel 16 at the rear of the tractor. The illustration of the tractor is largely diagrammatic, as its specific structure is unimportant except that it is preferably of the high frame row-crop type having traction wheels spaced to span two plant rows. The type of tractor for combination with which the novel structure to be described is particularly adapted is substantially that shown and described in the patent to Anthony et al. No. 1,613,865 of January 11, 1927.

In carrying out the invention, two side frames are provided which are exactly similar in structure. Each side frame consists of a laterally and forwardly extending supporting bar 17. At its inner end this bar is pivoted to the side of the tractor at a point near its rear end by means of a longitudinally extending hinge shaft 18, the ends of which are carried in pivot brackets 19 and 20 secured to the side of the tractor body. The supporting bar 17 is preferably arched upwardly, as seen in Figure 2, and extends diagonally forwardly to a point well beyond the traction wheel at that side of the tractor and in a transverse vertical plane intersecting the steering wheels. The outer end of bar 17 is provided with a vertical bearing bracket 21 at which there is swiveled the vertical portion of a caster truck 22 having a caster wheel 23. A secondary frame bar 24 is pivoted on the opposite end of the hinge rod 18 from the pivot point of the bar 17 and extends outwardly at right angles to the tractor body to a point of connection, as at 25, with the outer end of the bar 17. The bar 17, hinge bar 18, and secondary bar 24 together thus form a substantially right angled triangle, the base of which is hinged on the tractor in a manner to prevent any horizontal fore and aft movement of the attachment frame while permitting free floating movement thereof vertically.

With an attachment frame constructed as above described mounted at each side of the tractor, the machine can be easily guided along plant rows or beds, as the caster wheels are well forward and in view from the operator's station. There will be no interference with turning movements of the tractor, as the caster trucks supporting the outer ends thereof will readily follow the steering movements imparted to the tractor steering wheels and each of the frames will readily accommodate itself to any variations in the ground surface. Moreover, the attachment frame extends horizontally substantially on the level of the tractor frame and is elevated a substantial distance above the ground for reception of agricultural implements to be connected beneath it, one type of which combination will now be described.

In one of the preferred combinations of agricultural implements with the side frames there are employed two two-row straddle row cultivators. Each of these cultivators comprises a frame having transverse bars 30—31, the inner ends of which may be hinged on the bar 18, and the outer ends of which extend beyond the supporting bar 17 where the cultivator frame is secured to said bar as by supporting links 32—33. A crossbar 34 connects the outer ends of the transverse cultivator frame bars 30—31 and suitable brace bars 35 may be used to secure the frame bar 30 to bar 24. The cultivator frame is provided with the usual laterally shiftable arches shown at 36 (Figure 2), and the arms of the arches carry the usual bearing brackets 37 in each of which there is pivoted the cultivator beam 38. Thrust rods 39 connect the brackets 37 with the cultivator frame. In order to provide further resistance to working stresses, a tension rod 40 is provided. This rod connects the outer end of the cultivator frame with a bracket 41 on the forward end of the tractor, the bracket having an apertured lug 42 on which the rod 40 is loosely held, as by the nut 43. The rod 40 is preferably bent over the main supporting bar 17, as shown in Figure 2, giving a truss effect, but, due to its loose mounting in the bracket 41, there is no interference with the floating movement of the frame. Simultaneous lateral shifting movement of the cultivator arches and beams is effected through a forwardly extending arm 45 fixed to the standard of the steering truck, which arm is connected, as by a link 46, to a connecting rod 47, the ends of which are in turn connected to the long arms of bell crank levers 48. These levers are pivoted to the frame bar 24 of each attachment at 49, and the ends of the short arms are connected by a link 50 with a second bell crank lever 51 pivoted on the cultivator frame at 52. The rearwardly extending arm of the bell crank lever 51 is slotted to receive a pin 53 on a yoke piece 54 which is supported on the cultivator frame by an arm 55. The arms of the yoke piece 54 have oppositely extending links 56 which are respectively connected to bracket arms 57 on the cultivator arches. With this arrangement common to the cultivator attachment at each side of the tractor, lateral shifting movement in the same direction will be transmitted to all four arches and, therefore, to all four pairs of straddle row gangs. The shifting movement will be controlled by rotation of the steering control wheel 16, and the simultaneous steering movement of the truck will serve to amplify the movement of the cultivator gangs laterally.

The cultivator organization described, therefore, exemplifies a self-propelled tractor cultivator capable of working on four or more rows, in which one of the pairs of gangs at each side of the tractor is located within the tread lines of the traction wheels with the other pairs located beyond said wheels, and all supported so that the cultivator at each side of the tractor has independent vertical movement.

The structure and organization above described embodies a preferred form of the invention, but it will be obvious that various modifications and substitutions may be made without departure from the invention as defined in the following claims.

What is claimed is:

1. The combination with a tractor having rear traction wheels and a longitudinally extending body supported on forward steering wheels, of means for connecting implements at one side of the tractor, comprising a shaft journaled on the side of the tractor body in longitudinally spaced bearings, a forwardly and outwardly directed bar in fixed relation to said shaft and extending on approximately the level of the body and having its forward end lying in a vertical transverse plane passing through the steering wheels, a caster wheel supporting the forward end of said bar, and means for connecting an implement to said bar at the inner side of the caster wheel.

2. The combination with a tractor having rear traction wheels and a longitudinally extending body, of an implement carrying means comprising a forwardly and outwardly directed elevated supporting bar hinged on a horizontal longitudinal axis to the rear portion of the tractor body and extending beyond the traction wheels, a ground engaging support on the outer end of said bar, an implement comprising frame bars hinged to the tractor body at forward points and extending outwardly beyond said bar at substantially the level of the tractor body, and connecting means between said supporting bar and said implement frame bars.

3. The combination with a tractor having rear traction wheels and a longitudinally extending body, of an implement carrying means comprising an upwardly arched forwardly and outwardly directed supporting bar hinged on a horizontal longitudinal axis to the rear portion of the tractor body and extending beyond the traction wheels, a ground engaging support on the outer end of said bar, and an implement frame under said bar having its inner side pivoted at forward points on the tractor and its outer portion supported by said bar.

4. A row crop cultivator comprising the combination of a self-propelled vehicle having traction wheels spaced to span two plant rows and a narrow central body supported at one end by said wheels and at its other end on steering wheels, a laterally extending floating frame hinged to each side of said vehicle body at a plurality of longitudinally spaced points located between the steering and traction wheels, ground engaging supports on the outer ends of said floating frames, and multiple pairs of cultivator beams carried by each floating frame and disposed in straddle-row relation with one pair of beams on each frame located within the tread lines of the traction wheels.

5. A row crop cultivator comprising the combination of a self-propelled vehicle having rear traction wheels spaced to span two plant rows and a narrow central body supported at its rear end by said wheels and at its front end on steering wheels, control means at the rear of the vehicle for steering said wheels, a laterally extending floating frame hinged to each side of said vehicle body at a plurality of longitudinally spaced points located between the steering and traction wheels, ground engaging supports on the outer ends of said floating frames, multiple pairs of laterally shiftable cultivator beams carried by each floating frame and disposed in straddle-row relation with one pair of beams on each frame located within the tread lines of the traction wheels, and means operable by the steering control means for shifting the cultivator beams on both floating frames simultaneously in the same lateral direction.

6. The combination with a tractor having rear traction wheels and a longitudinally extending body supported on forward steering wheels, of means for connecting implements at one side of the tractor, comprising a horizontally disposed frame located in the space between the front and rear wheels and having one side hinged on a horizontal longitudinal axis to the side of the tractor body intermediate the front and rear wheels and extending outwardly beyond the traction wheel substantially on the level of the tractor body, a caster wheel supporting the outer part of said frame, and a soil engaging implement trailing from said frame and connected thereto on a transverse horizontal axis.

7. The combination with a tractor having rear traction wheels and a longitudinally extending body supported on forward steering wheels, of means for connecting implements at one side of the tractor, comprising a triangular frame located in the space between the front and rear wheels and having its base hinged on a horizontal longitudinal axis to the side of the tractor body intermediate the forward and rear wheels and extending outwardly beyond the traction wheel substantially on the level of the tractor body, a caster wheel supporting the outer end of said frame, and a plurality of soil engaging implements carried by said frame in laterally spaced relation at either side of the line of tread of the adjacent traction wheel.

8. A four row implement comprising the combination of a tractor having widely spaced rear traction wheels and a narrow central body supported at its rear end on said wheels and at its forward end on steering wheels, a laterally extending floating frame hinged to each side of the tractor body to swing vertically and extending beyond the traction wheels, said frames being located in the space between the traction and steering wheels, a caster wheel supporting the outer end of each frame, and a plurality of soil engaging implements carried by each frame in laterally spaced relation and at either side of the lines of tread of the traction wheels.

9. A four row implement comprising the combination of a tractor having rear traction wheels spaced to span two plant rows and a narrow central body supported at its rear on said wheels and at its forward end on a steering truck positioned to travel in the space between the rows spanned by the traction wheels, a triangular frame at each side of the body having one of its members extending outwardly immediately forward of a traction wheel and another of its members extending parallel to the tractor body and hinged thereto on a longitudinal axis, said frames being positioned in the space between the truck and traction wheels and extending horizontally outwardly with their outer angles located at lateral points beyond the traction wheels, a supporting wheel on the end of each frame beyond a traction wheel, and a two row soil engaging implement carried by each frame with its row working tools positioned at either side of the lines of treads of the traction wheels.

10. A row crop cultivator comprising the combination of a self propelled vehicle having traction wheels at the rear spaced to span two plant rows and a narrow central body supported at the rear by said wheels and having a steering truck pivoted on a vertical axis at the forward end of the body, means on the vehicle for steering the truck, a laterally extending implement frame connected to the body behind the axis of the truck and forwardly of the traction wheels, cultivating tools located in advance of the traction wheels and connected to the frame for lateral shifting movement, and means connecting the truck and tools for shifting the tools collectively in the same direction through steering movements of the truck.

In testimony whereof I affix my signature.

BERT R. BENJAMIN.

CERTIFICATE OF CORRECTION.

No. 1,769,103.   Granted July 1, 1930, to

BERT R. BENJAMIN.

It is hereby certified that error appears in the printed specification of the above numbered patent requiring correction as follows: Page 3, line 93, claim 8, strike out the word "caster"; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.